(12) United States Patent
Bergamante

(10) Patent No.: US 7,708,030 B2
(45) Date of Patent: May 4, 2010

(54) HYDRAULIC JOINT ARTICULATED DEVICE AND USE THEREOF WITH A HEAT RADIATOR

(75) Inventor: Raffaele Bergamante, Via Cona, 172, Teramo (TE) (IT) 64100

(73) Assignees: Alejandro Bozzi, Teramo (IT); Giampiero Ledda, Teramo (IT); Raffaele Bergamante, Teramo (IT)

( * ) Notice: Subject to any disclaimer, the term of this patent is extended or adjusted under 35 U.S.C. 154(b) by 946 days.

(21) Appl. No.: 10/553,016

(22) PCT Filed: Feb. 24, 2004

(86) PCT No.: PCT/IB2004/050139

§ 371 (c)(1),
(2), (4) Date: Aug. 1, 2006

(87) PCT Pub. No.: WO2004/090428

PCT Pub. Date: Oct. 21, 2004

(65) Prior Publication Data

US 2006/0273576 A1    Dec. 7, 2006

(30) Foreign Application Priority Data

Apr. 10, 2003    (WO) .................. PCT/IT03/00223

(51) Int. Cl.
*F16L 35/00*    (2006.01)

(52) U.S. Cl. ........................ 137/615; 137/360

(58) Field of Classification Search .............. 137/615, 137/357, 360
See application file for complete search history.

(56) References Cited

U.S. PATENT DOCUMENTS 4,372,344 A * 2/1983 Stafford ................ 137/615
6,742,814 B2 * 6/2004 Resmo et al. ........... 137/615

FOREIGN PATENT DOCUMENTS

FR        593548      8/1925
GB        2150685     7/1985

* cited by examiner

*Primary Examiner*—Kevin L Lee
(74) *Attorney, Agent, or Firm*—Leffert Jay & Polglaze, P.A.

(57) ABSTRACT

A hydraulic joint articulated device (1) effectively supports a radiator allowing a remarkable freedom of motion and has a pair of articulated connectors (2), each comprising: hinge members (5, 6) apt to be assembled and comprising a respective hydraulic channel (7, 8), in which there is obtained a pin seat (9, 10) with a tubular pin (14) having a respective hydraulic channel (21) forming a hydraulic joint extending between the respective connector seats (11, 12); and a valve seat (22) at one end of said tubular pin (14), and a respective shutter member (23) located in an opening (24) obtained in one (5) of said hinge members (5, 6), further comprising, at each articulated connector (2), a tubular duct (29) extending from the respective connector seat (11) to a mouthpiece section (30) apt to receive a waterworks piping (4), extending inside a masonry.

18 Claims, 8 Drawing Sheets

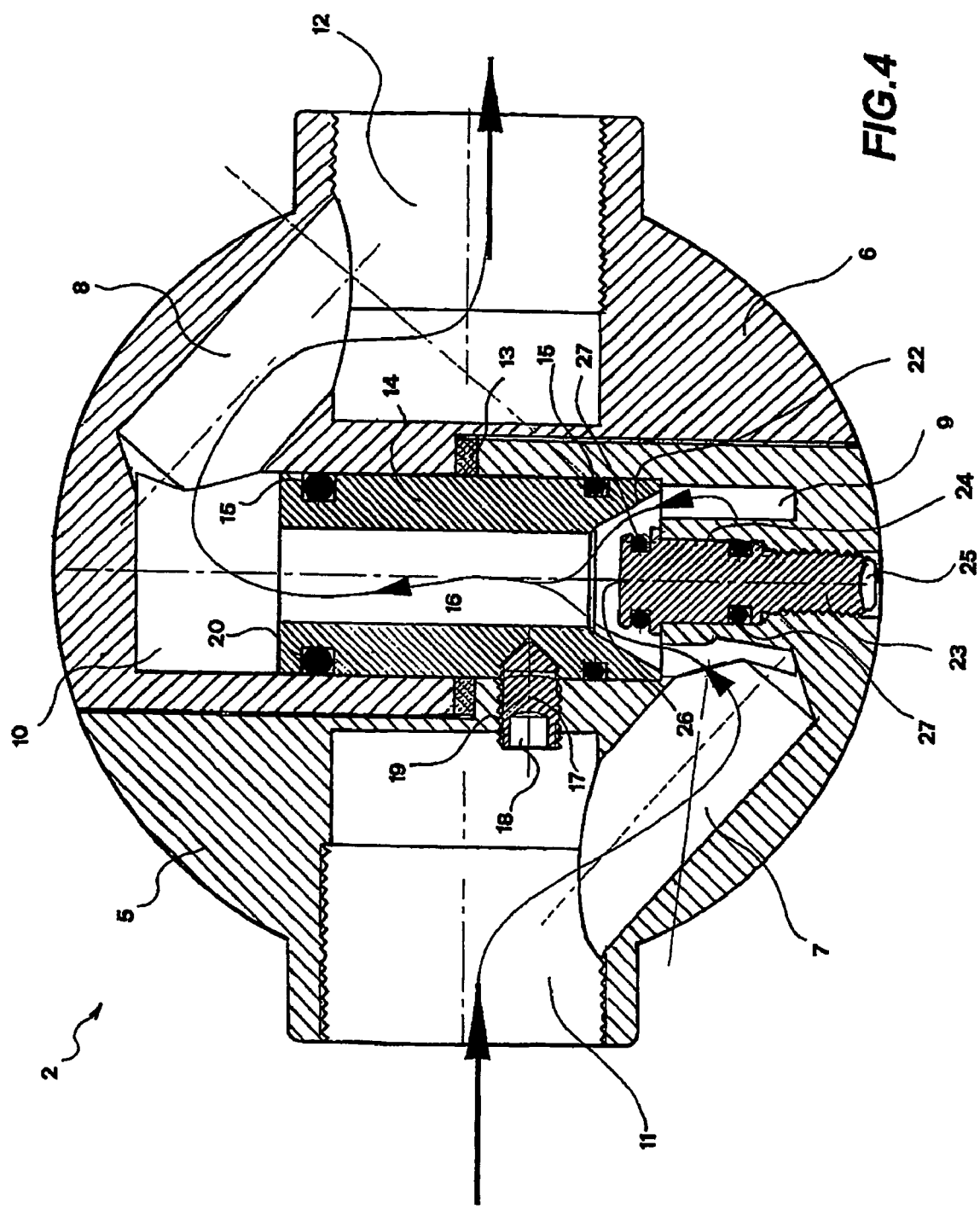

HYDRAULIC JOINT ARTICULATED DEVICE AND USE THEREOF WITH A HEAT RADIATOR

The present invention refers to a hydraulic joint articulated device and to a particular use thereof in the specific field of heat radiators circulated by a heat transfer fluid. The present invention further refers to a heat radiator circulated by a heat transfer fluid comprising such an articulated device.

There are several known hydraulic joints between a heat radiator as above specified and the respective waterworks. Such a joint comprises an inlet section and an outlet section, generally equipped with valves for shutting and retaining the heat transfer fluid, generally hot water. Said valves are actuated by taps or by screw cut-off apparatuses tapping into the fluid channel.

Likewise, a known joint device allows the rotation of the radiator about an axis positioned at the joint.

This type of joint device substantially works as a hinge and it is arranged to connect a radiator to said wall inlet and outlet sections or to connect different radiator sections thereamong. Such a device is disclosed in the Italian Patent N° 1,313,712.

It deals with the problem of the relative rotation between radiator and wall or between two radiators, determining a hydraulic joint that crosses an articulation working as supporting hinge.

However, it is apparent that the weight of the radiator, usually supported by wall hooks or by other supports unconstrained by the hydraulic joint, is completely charged onto the joint device.

Moreover, there has to be provided the presence of said shutting and retaining valves at a spot of the hydraulic joint separated from the device, in order to allow the usual steps of radiator emptying, loading, flow rate adjusting, bleeding, etc.

The state of the art does not allow to solve the problems related to the above drawbacks, in particular due to the difficult adaptation between such a hydraulic joint articulated device and the usual known hydraulic connectors.

Moreover, it is understood that said drawbacks are not limited to the field of heat radiators, extending to any hydraulic device supported by articulated hydraulic joints. The technical problem underlying the present invention is to provide a hydraulic joint articulated device allowing to overcome the drawbacks mentioned with reference to the known art.

Such a problem is solved by a device as specified above, having a pair of articulated connectors, each comprising:

- A first hinge member and a second hinge member, apt to be assembled and comprising a respective hydraulic channel, in which there is obtained a pin seat, and a respective connector seat with a duct;
- a tubular pin having a respective pin hydraulic channel forming, with the hydraulic channels of said first and second hinge members, a hydraulic joint extending between the respective connector seats; and
- a valve seat at one end of said tubular pin and a respective shutter member located in an opening obtained in one of said hinge members so that the relative position between shutter member and valve seat may be adjusted by directly acting on said shutter member, wherein, at each articulated connector, a tubular duct extends from the respective connector seat to a mouthpiece section apt to receive the abovementioned waterworks piping, extending inside a masonry.

The main advantage of the hydraulic joint articulated device according to the present invention lies in determining a direct mechanical support between the feed or waterworks piping, arranged inside a masonry or an alike support structure, and the hydraulic system which is connected by the hydraulic joint device, concomitantly incorporating valve means for shutting, retaining and adjusting the flow of heat transfer fluid internal to the articulated connector, so that the structure be apt to support even considerable weights on one of the hinge members of the connector.

Of course, this advantage is not confined to the field of heat radiators, extending to any hydraulic device requiring an articulated hydraulic joint.

However, object of the present invention is also the use of a joint device as defined hereto in a wall heat radiator and a wall heat radiator comprising said device.

The present invention will hereinafter be described according to three preferred embodiments thereof, together with a preferred application thereof, given by way of example and without limitative purposes with reference to the annexed drawings, wherein:

FIG. 4 is an enlarged longitudinal section view of the detail of FIG. 3A;

Figure 1:
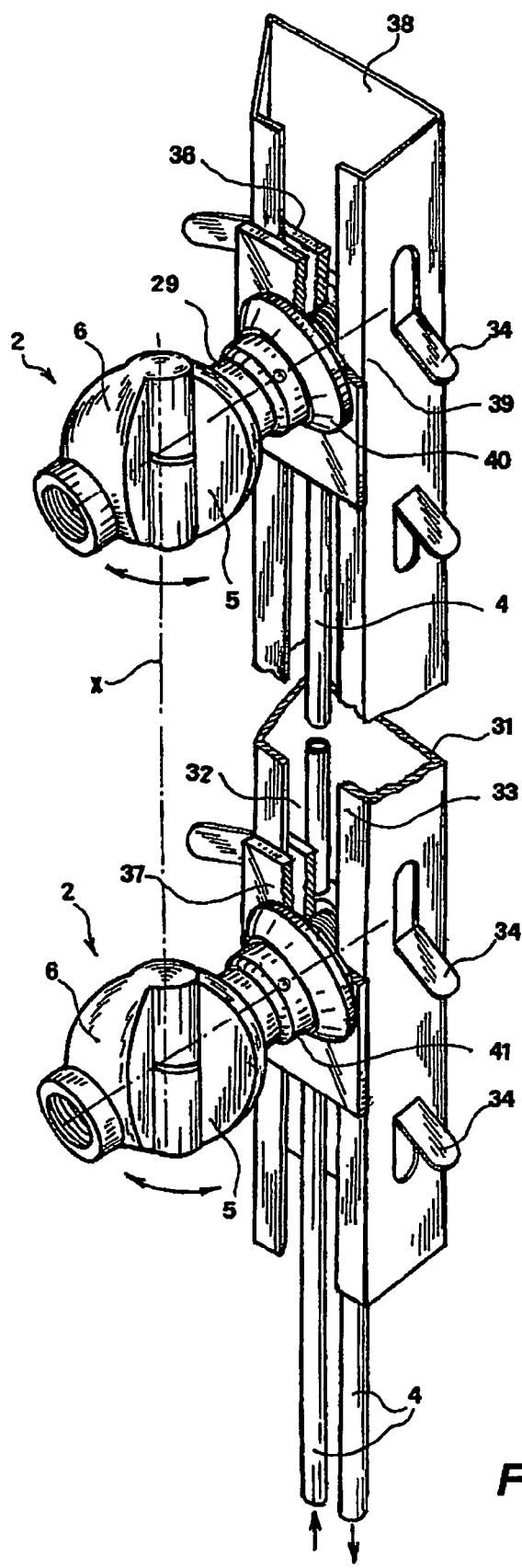
FIG. 1 is a partially sectional perspective view of a first embodiment of a hydraulic joint device.
Figure 5A:
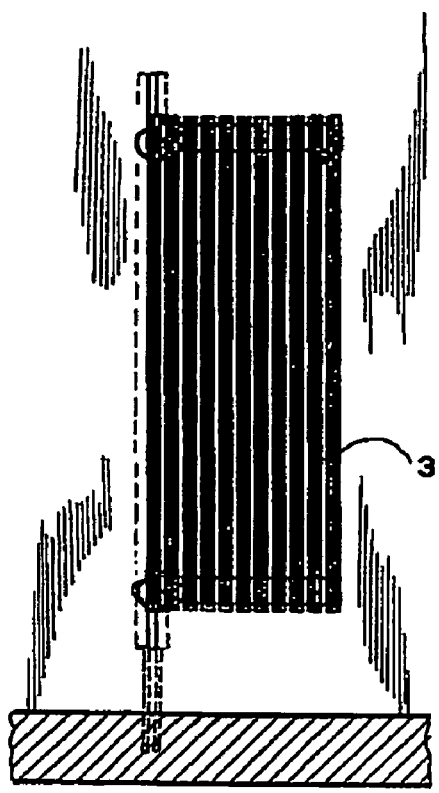
Figure 5B:
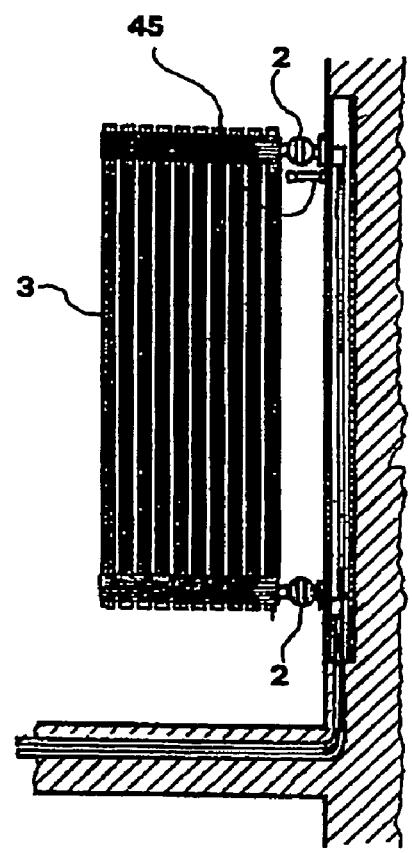
Figure 5C:
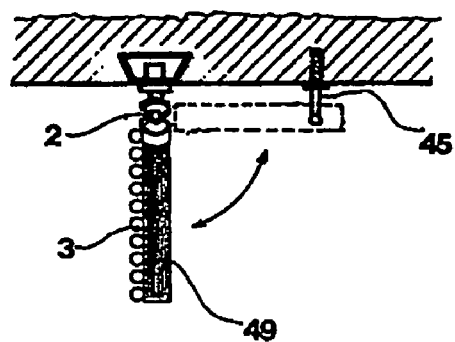
Figure 6:
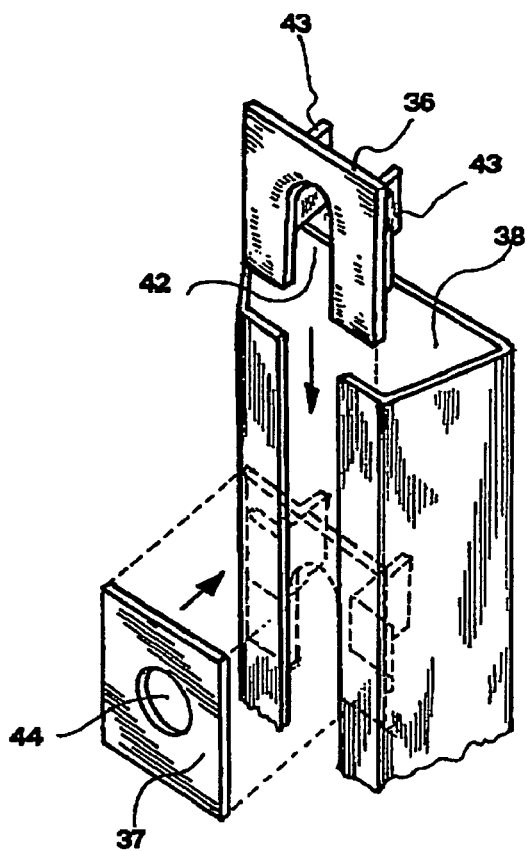
Figure 7:
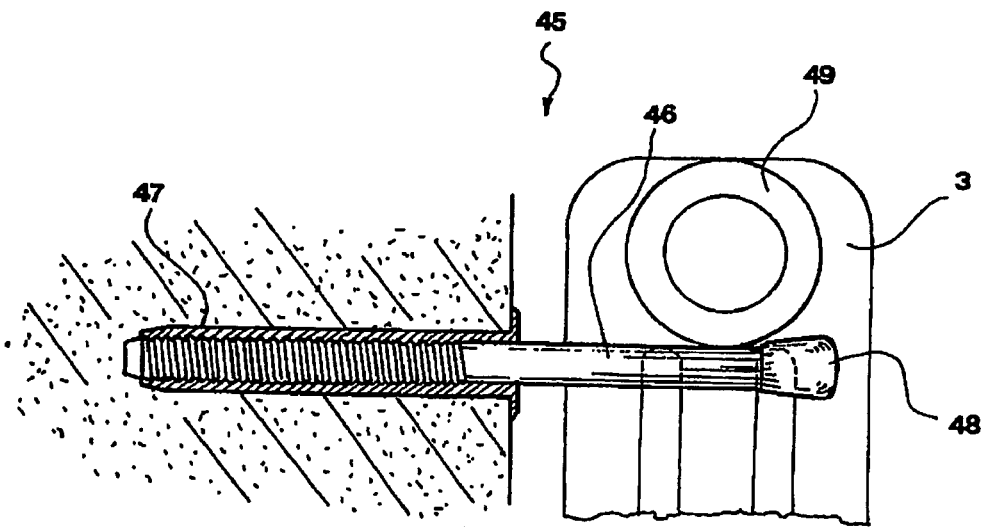
Figure 8:
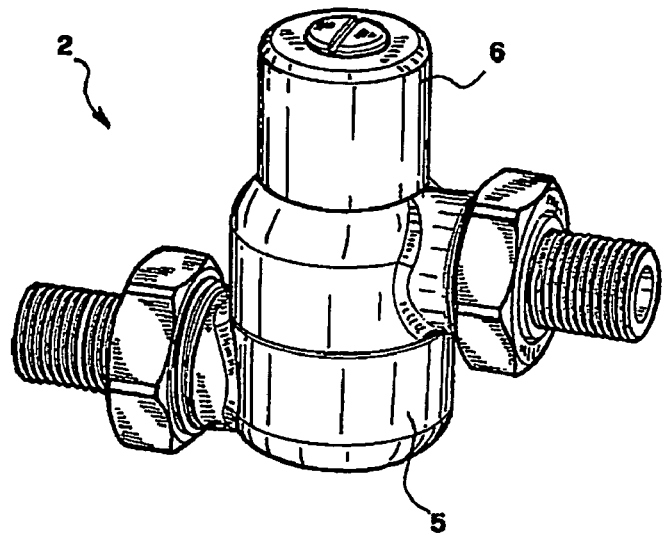
Figure 9:
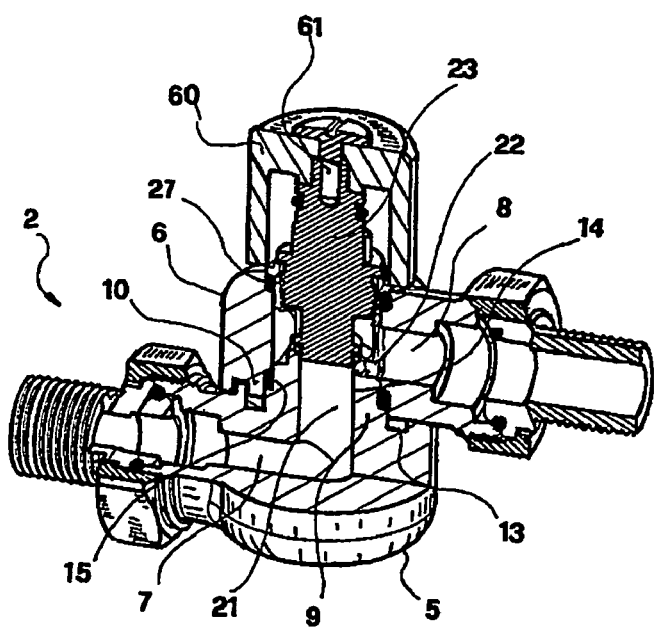
Figure 9A:
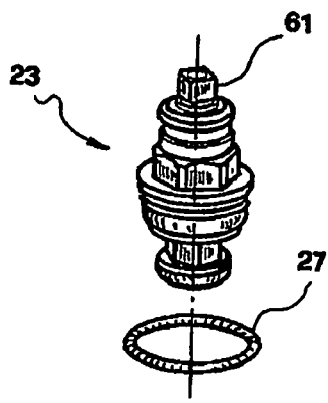
Figure 10:
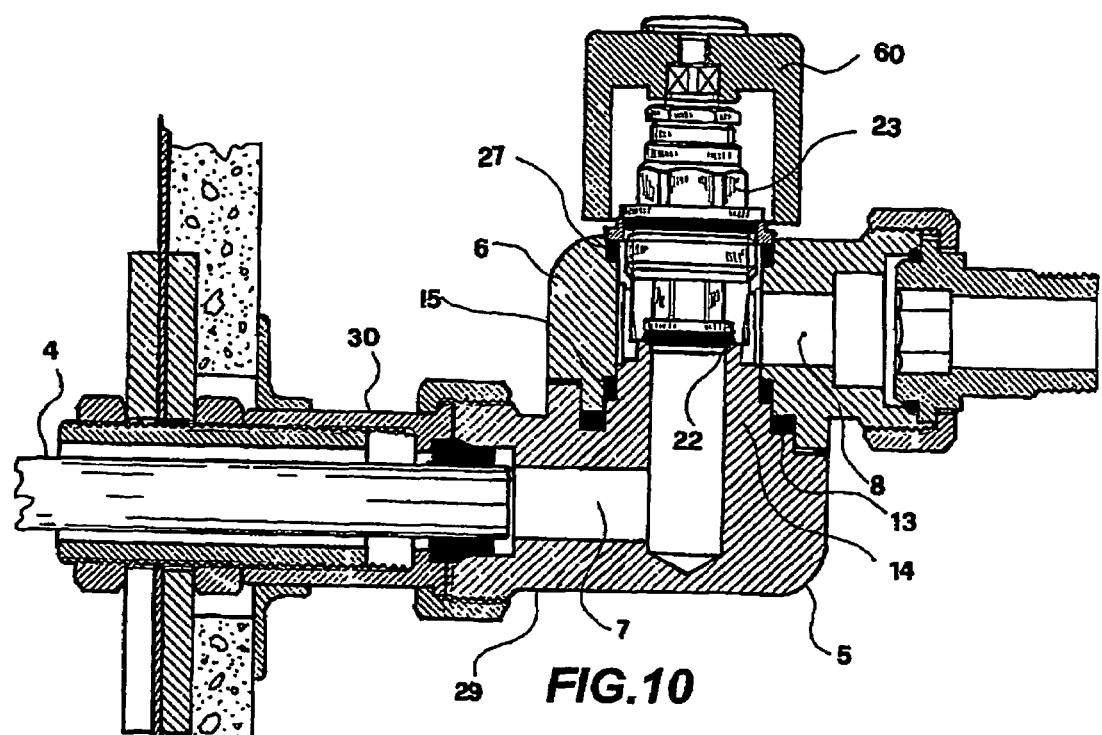
Figure 11:
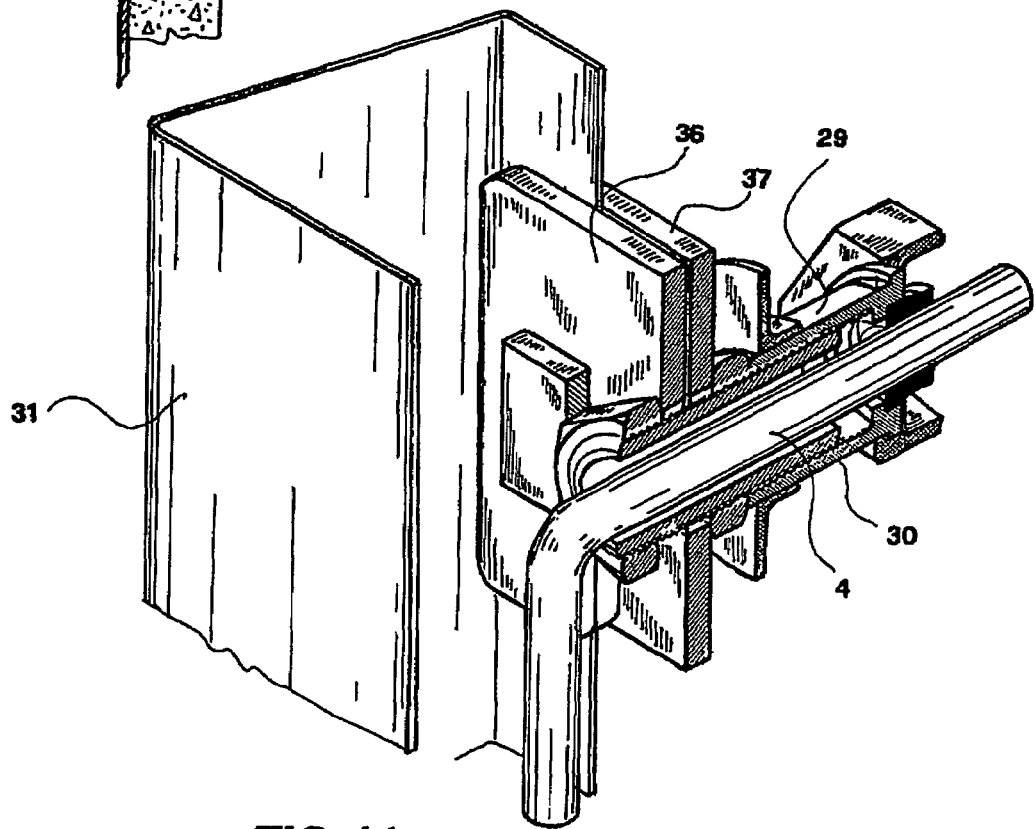
Figure 12:
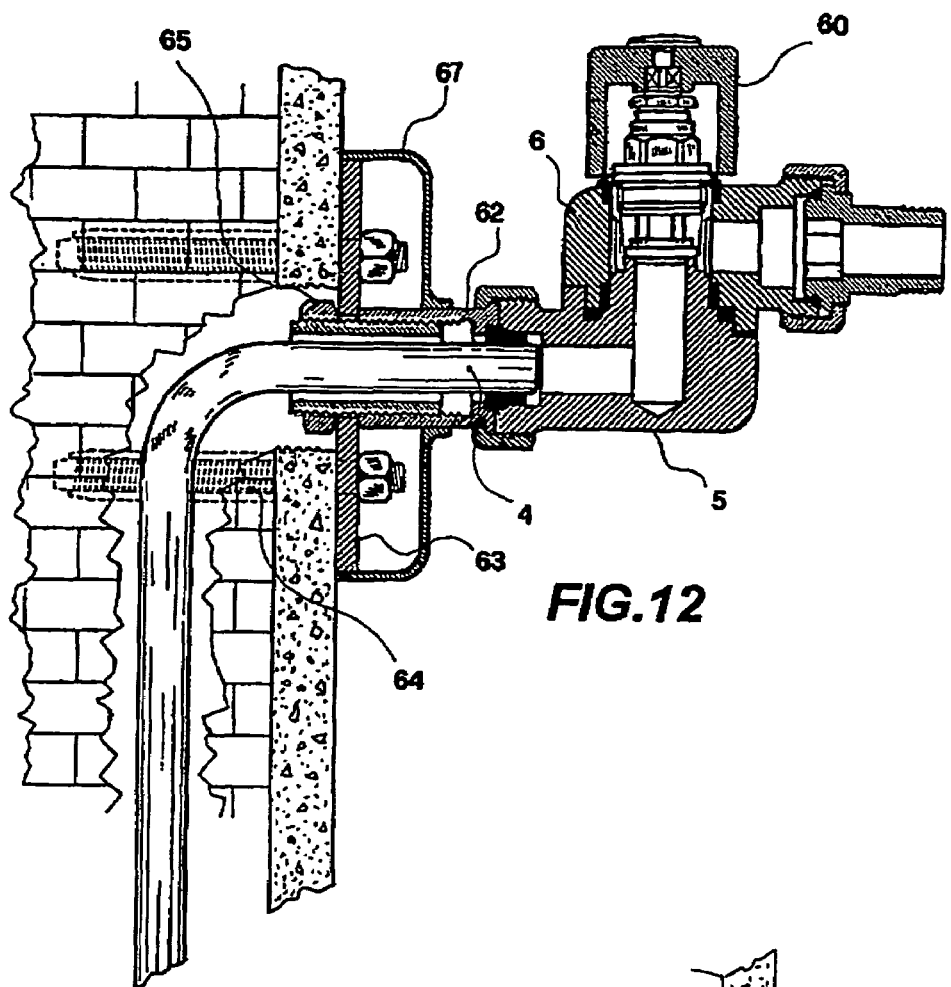
Figure 13:
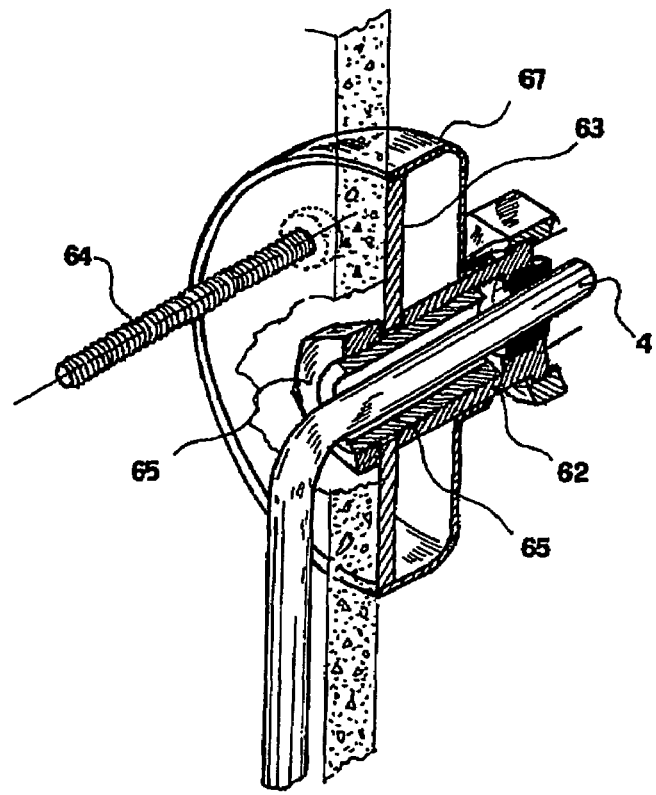

FIGS. 5A, 5B e 5C are elevation plan views of the device of FIG. 1 applied to a heat radiator;

FIGS. 6 and 7 are a partially sectional perspective view and an elevation sectional view of details of the embodiment of the preceding figures, respectively;

FIG. 8 is a perspective view of a second embodiment of the device according to the invention;

FIG. 9 is the view of the preceding Figure, in a section;

FIG. 9A is a perspective view of a component of the embodiment of FIG. 8;

FIGS. 10 and 11 are an elevation sectional view and a perspective view of the device of FIG. 8 in an application thereof, respectively; and FIGS. 12 and 13 are an elevation sectional view and a perspective view of a third embodiment of the device according to the invention in an application thereof, respectively.

With reference to FIGS. 1 to 5C, a hydraulic joint articulated device is generally indicated by 1. The present embodiment is particularly, yet not exclusively, destined to the field of heat radiators, in order to allow the rotation of the latter about an axis X defined by the hydraulic joints between radiator and waterworks.

In this embodiment, the connectors working as supporting hinges incorporate the hydraulic joint.

To this end, the present embodiment of hydraulic device 1 comprises a pair of articulated joint connectors, indicated by 2. They are intended to be located at the inlet section and at the outlet section of a radiator, indicated by 3 (FIGS. 5A, 5B, SC). Likewise, said connectors are intended to be connected to piping 4 of said waterworks in order to allow a heat transfer fluid, e.g. heated water, to circulate the radiator (FIG. 1).

For the sake of clarity, there will be described first the connectors 2, then the joint between said connectors 2 and the piping and then the supporting works for the connectors 2 and for the radiator (or equivalent hydraulic device), all components incorporated in the same hydraulic device 1.

Figure 2:
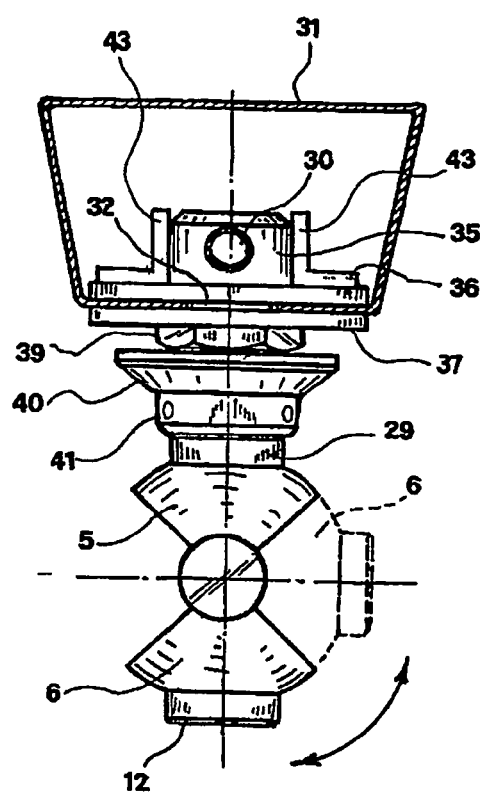
FIG. 2 is a partially sectional plan view of a detail of the device of FIG. 1.
Figure 3:
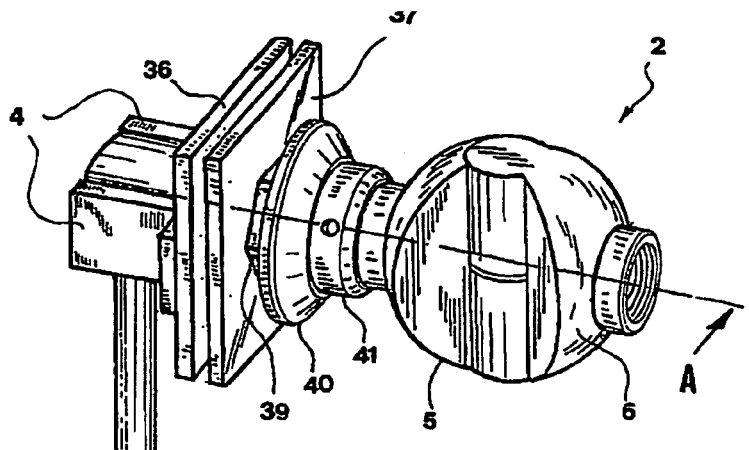
FIG. 3 is a perspective view of the detail of FIG. 2.

Each articulated connector 2 comprises a first hinge member 5 and a second hinge member 6, both having the shape, defined by a respective rigid casing, of a 90°-wide sphere sector so as to allow a 180° rotation thereof. Different rotations could be attained with different widths, compatible with the required rotation (FIGS. 2 and 3).

In the present embodiment, the first hinge member 5 is the stationary member, connected to the waterworks, whereas the second hinge member 6 is the movable or rotating member, connected to the radiator 3 (FIGS. 5A, 5B, 5C). 1

Said hinge members 5, 6 are hollow, thereby comprising a respective first and second hydraulic channel 7, 8 and are located with the respective corners joined. Thereat, each hinge member 5, 6 comprises a respective first and second hollow pin seat 9, 10, opened onto the respective hydraulic channel 7, 8.

Figure 3A:
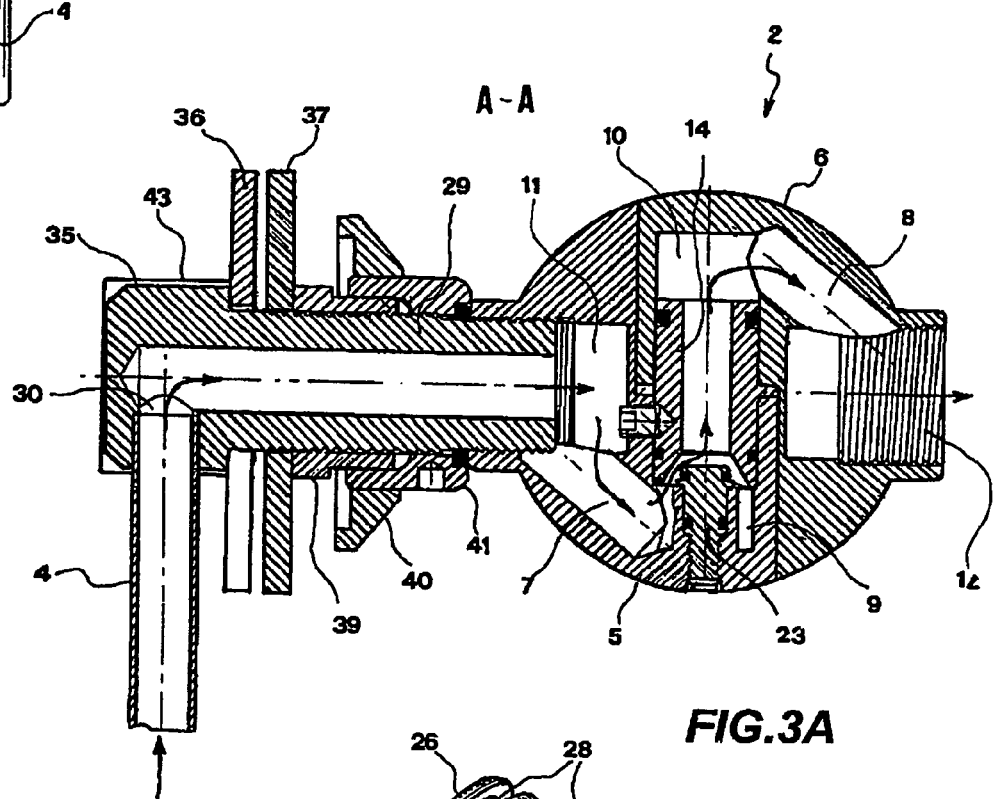
FIG. 3A is a longitudinal section view of the detail of FIG. 3 taken along line A-A.
Figure 3B:
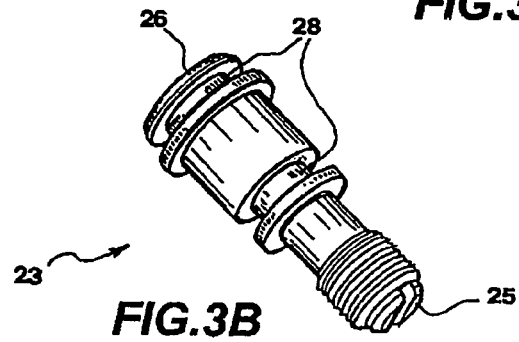
FIG. 3B is a perspective view of a construction detail of the detail of FIG. 3.

Furthermore, each hinge member 5, 6 comprises a respective first and second connector seat 11, 12, it also opened on said hydraulic channel 7, 8 to couple the articulated connector 2 to a tubular duct that will be described hereinafter (FIGS. 3A and 4).

The two pin seats 9, 10 are bush-shaped and are arranged head-to-head, partitioned by an antifriction washer 13, preferably made of Nylon or Teflon®.

The connector 2 further comprises a hollow-through tubular pin, which is inserted in said pin seats 9, 10 to rotatably connect the hinge members 5, 6.

At its ends, the tubular pin 14 has sliding O-ring gaskets 15 inserted in suitable annular grooves 20. Moreover, the former has a side recess 16 apt to be engaged by a fastening pin 17, inserted in said first hinge member 5 in a suitable threaded seat 19, adjustable through the pin head, via said connector seat 11, which will comprise a transversal notch or a cross, or a socket head screw seat 18. Thus, the tubular pin 14 remains integral to the stationary member 5.

Said tubular pin has and internally defines a respective pin hydraulic channel 21 forming, with the hydraulic channels 7, 8 of said first and second hinge member 5, 6, a hydraulic joint extending between the respective connector seats 11, 12.

It should be noted that the pin hydraulic channel is coaxial to the pin itself. The shape of said hydraulic joint remains identical even varying the angle between the hinge members 5, 6, a varying entailing no substantial increase or decrease of the load loss inherent to the articulated connector 2.

Said connector 2 comprises a valve seat 22 suitably obtained at one end of the tubular pin 14. In the present embodiment such end is that facing the stationary member 5.

Said valve seat 22 is made of a countersink formed onto the head of the pin 14 and onto the internal cylindrical surface of the latter, at said end.

Due to the shape of the first hydraulic channel 7 and of the respective pin seat 9, the heat transfer fluid has to pass through said valve seat 22.

The connector 2 further comprises a shutter member 23 located in an opening 24 obtained in one of said hinge members 5, 6, i.e. in the stationary member 5 in the case at issue. The shutter member 23 extends between the inside of the respective hinge member 5 and the outside, so that the relative position between shutter member 23 and valve seat 22 may be adjusted by directly acting on said shutter member 23. To this end, said opening 24 is a threaded hole that, together with the member 23, is coaxial to the tubular pin 14, i.e. to the axis of rotation of the connector 2, thereby giving to the member 23 the option of translating axially, there is ensured the perfect correspondence between it and the valve seat 22.

The shutter member 23 has it also a thread and it is substantially cylinder-shaped. It comprises a control head 25 having a slot, a socket head screw seat or the like and a plugging head 26 apt to insert in the valve seat 22. The member 23 further comprises side gaskets 27 near the two heads, both of the O-ring type, inserted in suitable annular grooves 28.

As it is apparent, the supporting structure is based on the hinge members 5, 6 and on a tubular pin 14 intrinsically having a high bending strength. The presence of valve means at the stationary hinge member 5 does not affect at all the structure strength to the weight of a heat radiator 3, or of an equivalent hydraulic device, which weighs on the connector even with a relevant torque.

Preferably, the hydraulic joint device 1 comprises a pair of articulated connectors 2 as described above. They can be spaced according to the dimensions of the hydraulic device to be supported and in any case wall-anchored.

To this end, each connector 2 comprises a rigid tubular duct 29, of remarkable structural strength, extending from the respective connector seat 11 of the first fixed hinge member 5 that, for this purpose, has an internal fastening thread cooperating with an analogous thread in the tubular duct 29. This duct 29 extends to a mouthpiece section 30 apt to receive the abovementioned waterworks piping 4. Therefore, the tubular duct 29 extends inside the masonry, at which the heat radiator or another hydraulic device is installed.

Hence, the joint device 1 comprises wall-anchoring means that will be described hereinafter.

Said anchoring means comprises an elongate box member 31, apt to be buried in the masonry. To this end, it may be made in sheared and bent plate or in beam material. Said member 31 is shaped as a rectilinear guide and is apt to be vertically arranged inside the masonry. Frontally, it has a longitudinal opening 32 that may be crossed by said tubular duct 29 without positional restrictions. At the sides of the opening 32 the elongate box member comprises plane edges 33. It also comprises clamps 34 formed by shearing onto the sidewalls, for an improved anchoring to the masonry and to allow the mortar to set, once the masonry is completed, in the box member 31.

Therefore, inside of the box member 31 there is comprised a recess 35 allowing to house the piping 4.

In order to allow the box member 31 to support the connectors 2, there are provided plate-coupling means between each tubular duct 29 and the longitudinal opening 32 of the box member 31. To this end, each tubular duct 29 ends in an enlarged hex head 35 that provides a ledge to a pair of plates 36, 37, first and second, respectively, fitted onto the duct 29. For this purpose, the plate 37 is provided with a circular hole 44 having a diameter equal to the external one of the duct 29, whereas the plate 36 is provided with an open slot 42 having a width equal to the external one of the duct 29. The first plate 36 is apt to be inserted inside the box member 31.

The plate 36 may be inserted transversally to the longitudinal opening 32 of the latter, and by virtue of the open slot 42 it may slide down onto the duct 29 and block the hex head 35 of the duct 29 by two side ledges 43 added thereon. Therefore, said plates 36, 37 are destined to be adhered on said plane edges 33 (FIG. 6).

The position of the first plate 36 is determined by the enlarged head 35, whereas the second plate 37, which remains external to the box member 31, may be pressed against said plane edges 33.

To this end, the surface of the tubular duct 29 is externally threaded and it is equipped with a tightening member 39, in particular a hex bush that may be tightened with a suitable wrench constraining the tubular duct 29 to the supporting box member 31.

In order to cover the tightening bush 39 there is provided a cover plate 40 fitted onto the tubular duct, that may be positioned by a further tightening bushing 41 modeled so as to be exposable.

The cover plate 40 is destined to adhere to a masonry surface, optionally plastered or tiled or covered otherwise, whereas the tightening plates 36, 37 would be arranged inside the masonry, covered by said masonry cover.

The installation may be carried out as follows. Upon setting the distance between the connectors 2 and the height from ground, it is possible to wall the box member 31 in a correct position, providing that the respective tubular ducts 29 be fastened thereto at a correct distance therebetween. To this end, when completing the masonry, the piping 4 could be located inside the box member 31, even for protection. Upon having completed the masonry and when the cement employed has set, there are obtained tubular ducts 29 projecting from the wall protected and covered by said plates 40.

A radiator 3 may be fastened thereto, interposing articulated connectors 2 of the hydraulic joint device 1, inserting the tubular ducts 29 in the connector section 11 and applying the same for the connector ducts of the radiator.

Hereinafter, there will be described a second embodiment of the above device, wherein functionally analogous components will be indicated by the same number reference.

With reference to FIGS. 8 to 11, a hydraulic joint articulated device is generally indicated by 1. Also in this second embodiment, the connectors working as supporting hinges incorporate the hydraulic joint.

The hydraulic device 1 comprises a pair of articulated connectors, indicated by 2, intended to be located at the inlet section and at the outlet section of a radiator, and to be likewise connected to piping 4 of said waterworks to allow a heat transfer fluid to circulate the radiator.

Each articulated connector 2 comprises a first hinge member 5 and a second hinge member 6, both having the shape, defined by a respective rigid casing, of a cylinder and arranged overlapped so as to form a single cylinder.

In the present embodiment, the first hinge member 5 is the stationary member, connected to the waterworks, whereas the second hinge member 6 is the movable or rotating member. Said hinge members 5, 6 are hollow, thereby comprising a respective first and second hydraulic channel 7, 8. Each hinge member 5, 6 further comprises a respective first and second hollow pin seat 9, 10, opened on the respective hydraulic channel 7, 8, and coaxial to the respective hinge member 5, 6. Furthermore, each hinge member 5, 6 comprises a respective first and second connector seat 11, 12 piece-formed therein, it also opened on said hydraulic channel 7, 8 to couple the articulated connector 2 to a tubular duct that will be described hereinafter (FIG. 9).

The two pin seats 9, 10 form a male-female coupling, partitioned by an antifriction washer 13, preferably made of Nylon or Teflon®.

The connector 2 further comprises a tubular pin 14, piece-formed with the first hinge member 5 and projecting from its pin seat 9 to be arranged into contact with the pin seat 10 of the second hinge member, in order to rotatably connect the hinge members 5, 6.

At its edge, the tubular pin 14 has a sliding O-ring gasket 15 inserted in a suitable groove.

Said tubular pin 14 has and internally defines a respective pin hydraulic channel 21 forming, with the hydraulic channels 7, 8 of said first and second hinge member 5, 6, a hydraulic joint extending between the respective connector seats 11, 12.

It should be noted that the pin hydraulic channel is coaxial to the pin itself. The shape of said hydraulic joint remains identical even varying the angle between the hinge members 5, 6, a varying entailing no substantial increase or decrease of the load loss inherent to the articulated connector 2.

Said connector 2 comprises a valve seat 22 suitably obtained at one end of the tubular pin 14. In the present embodiment, such end is that facing the stationary member 5. Said valve seat 22 is made of the top edge of the pin 14.

The connector 2 further comprises a shutter member 23 located in an opening obtained in one of said hinge members 5, 6, i.e. in the rotating member 6 in the case at issue. The shutter member 23 extends between the inside of the respective hinge member 6 and the outside, so that the relative position between shutter member 23 and valve seat 22 may be adjusted by acting directly on said shutter member 23.

To this end, said opening is a threaded hole that, together with the member 23, is coaxial to the tubular pin 14, i.e. to the axis of rotation of the connector 2, thereby giving to the member 23 the option of translating axially, there is ensured the perfect correspondence between it and the valve seat 22.

The shutter member 23 has it also a thread and it is substantially cylinder-shaped. It comprises a control head 25 having a handle 60 fastened to the shutter member 23 by a screw 61. The member 23 further comprises side gaskets 27 near the two heads, both of O-ring type, inserted in suitable annular grooves.

As it is apparent, the supporting structure is based on the hinge members 5, 6 and on a tubular pin 14 intrinsically having a high bending strength. The presence of valve means at the stationary hinge member 5 does not affect at all the structure strength to the weight of a heat radiator 3, or of an equivalent hydraulic device, which weighs on the connector even with a relevant torque. The articulated connectors 2 as above described, they can be spaced according to the dimensions of the hydraulic device to be supported and in any case wall-anchored.

To this end, each connector 2 comprises a rigid tubular duct 29, of remarkable structural strength, extending from the respective connector seat 11 of the first fixed hinge member 5 that, for this purpose, has an internal fastening thread cooperating with an analogous thread in the tubular duct 29. This duct 29 extends to a mouthpiece section 30 apt to receive the abovementioned waterworks piping 4. Therefore, the tubular duct 29 extends inside the masonry, at which the heat radiator or another hydraulic device is installed.

Hence, the joint device 1 comprises wall-anchoring means that will be described hereinafter.

Said anchoring means comprises an elongate box member 31, apt to be buried in the masonry. To this end, it may be made in sheared and bent plate or in beam material. Said member 31 is shaped as a rectilinear guide and is apt to be vertically arranged inside the masonry. Therefore, inside of the box member 31 there is comprised a recess 35 allowing to house the piping 4.

In order to allow the box member 31 to support the connectors 2, there are provided plate-coupling means between each mouthpiece section 30 and the box member 31, comprising a pair of plates 36, 37 provided with a circular hole 44.

The first plate 36 is apt to be inserted inside the box member 31.

With reference to FIGS. 12 and 13, a third embodiment is made of a variant to the anchoring means of the preceding embodiments.

In this embodiment, the box member 31 is not provided, since said anchoring means is constructed to be fastened to an extant masonry, from which a waterworks piping 4 projects.

Each connector 2 is connected, by a screw coupling, to a tubular joint 62 through which said waterworks piping 4 is passed. The tubular joint 62 is fitted in a hole of a coupling plate 63 that can be directly wall-fastened by screw anchors 64 or by analogous systems. The coupling between tubular joint 62 and plate 63 is ensured by a further joint 65 internal to the preceding one and fastened thereto by means of a screw coupling, said further joint 65 being equipped with a head 66 that is tightened onto the plate 63, thereby imprisoned therebetween.

Then, the coupling plate 63 is covered with a cap 67.

Once mounted, the radiator 3 may be rotated from a traditional wall-adhering position to a projecting position that may be useful for several reasons, e.g. for cleaning, to employ the radiator more centrally with respect to the surrounding environment, to use it as towel drier, etc.

In order to prevent that the articulated connectors 2 be subjected to excessive stress in supporting, in any configuration, the weight of the radiator, in the most frequently adopted configuration there may be provided additional supporting means, in order to at least partially discharge the weight of the radiator on another member (FIG. 7). Assuming by way of example the wall-adhering position to be the resting position of the radiator 3, there may be provided a supporting member 45 comprising a projecting pin 46 embedded in the wall perpendicularly thereto, e.g. by virtue of conventional fastening means like a screw anchor 47. It is understood that said additional supporting means could also comprise two or more members 45, even at staggered heights and having a different structure thereamong.

The head 48 of the projecting pin may be made of a shock-resistant material, e.g. rubber or the like, and have a rounded end that, by exploiting the elasticity of the pin 46, allows the head 48 to be inserted below the transversal duct 49 common to all radiators, or anyhow below any other structural member of the radiator 3 itself.

Thus, the weight of the radiator 3 is brought to rest on the pin 46.

Moreover, there may be provided variants to the additional supporting means, e.g. wheels or the like.

Hence, apparently the use of the present device 1 is particularly, yet not exclusively, advantageous with said heat radiators. The present invention further refers to a heat radiator comprising said articulated connectors 2 or the entire hydraulic joint device 1.

To the abovedescribed device a person skilled in the art, in order to meet further and contingent needs, may effect several further modifications and variants, all however falling within the protective scope of the present invention, as set forth by the annexed claims.

The invention claimed is:

1. A hydraulic joint articulated device having a pair of articulated connectors, each comprising:
   a first hinge member and a second hinge member adapted to be assembled and comprising a respective hydraulic channel, in which there is a pin seat, and a respective connector seat with a duct;
   a tubular pin having a respective pin hydraulic channel forming, with the hydraulic channels of said first and second hinge members, a hydraulic joint extending between the respective connector seats;
   a valve seat at one end of said tubular pin and a respective shutter member located in an opening in one of said hinge members so that a relative position between the shutter member and the valve seat may be adjusted by directly acting on said shutter member;
   a tubular duct, at each articulated connector, extending from the respective connector seat to a mouthpiece section adapted to receive waterworks piping, extending inside a masonry; and
   wall anchoring means at each articulated connector and at the respective tubular duct,
   wherein said anchoring means comprise an elongate box member, adapted to be buried in the masonry, the box member having a longitudinal opening that may be crossed by said tubular duct without positional restrictions, at sides of the openings, the elongate box member comprising plane edges, a recess inside of the box member to house piping; and plate coupling means between each tubular duct and the longitudinal opening of the box member.

2. The device according to claim 1, wherein the elongate box member comprises clamps formed onto the sides of the opening.

3. The device according to claim 2, wherein said plate coupling means comprises a pair of plates fitted onto the tubular duct, the first plate being adapted to be inserted inside the elongate box member whereas the second plate is pressed against an exterior of said plane edges by a tightening member.

4. The device according to claim 3, wherein the plate coupling means comprises a cover plate fitted onto the tubular duct at each tightening member.

5. The device according to claim 1, wherein said first hinge member and second hinge member both have a shape, defined by a respective rigid casing, of a sphere sector.

6. The device according to claim 5, wherein said sphere sector has a 90° width so as to allow a 180° relative rotation.

7. The device according to claim 1, wherein said pin seats are arranged head-to-head and are partitioned by an antifriction washer.

8. The device according to claim 1, wherein the tubular pin has O-ring gaskets inserted in annular grooves.

9. The device according to claim 1, wherein the tubular pin has a side recess adapted to be engaged by a fastening pin, inserted in a hinge member in a seat, adjustable through the respective connector seat.

10. The device according to claim 1, wherein the pin hydraulic channel is coaxial to the tubular pin.

11. The device according to claim 1, wherein said valve seat is made of a countersink formed onto a head of the tubular pin and onto an internal cylindrical surface of the tubular pin.

12. The device according to claim 1, wherein said opening in the one of said hinge members is in a stationary hinge member of said hinge members.

13. The device according to claim 1, wherein the shutter member extends between an inside of the respective hinge member and an outside and wherein said opening in the one of said hinge members is a threaded hole that, together with the shutter member, is coaxial to the tubular pin and to the axis of rotation of the articulated connector, thereby giving to the shutter member an option of translating axially, there being ensured correspondence between the shutter member and the valve seat.

14. The device according to claim 1, comprising additional supporting means in order to at least partially discharge the weight of a radiator when the radiator is connected to the pair of articulated connectors.

15. The device according to claim 14, wherein said additional supporting means comprises at least one supporting member.

16. The device according to claim 15, wherein said at least one supporting member comprises a projecting pin embedded in a wall of the masonry by virtue of fastening means or a screw anchor.

17. The device according to claim 16, wherein a head of the projecting pin is made of a shock-resistant material or rubber and has a rounded end that, by exploiting elasticity of the projecting pin, allows the head to be inserted below a structural member of the radiator itself.

18. A heat radiator comprising at least one articulated connector or a hydraulic joint articulated device of claim 1.

* * * * *